Sept. 26, 1939.     G. W. HAURY     2,174,105
RESILIENT COUPLING FOR TUBING
Filed Oct. 6, 1936
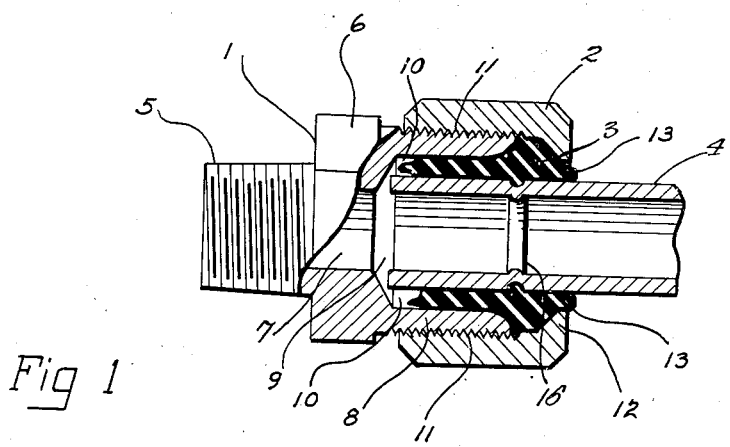
Fig 1
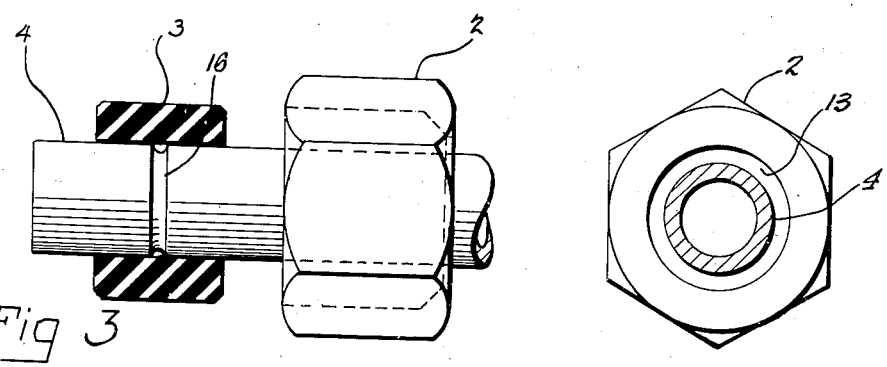
Fig 3
Fig 2
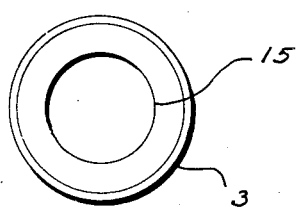
Fig 4
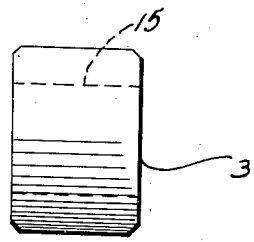
Fig 5
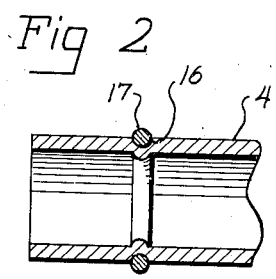
Fig 6
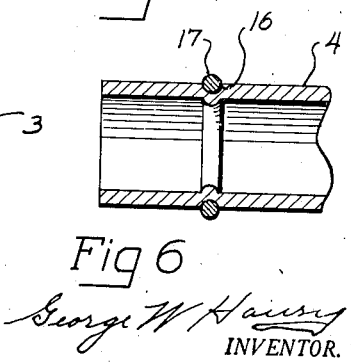
George W Haury
INVENTOR.
BY
ATTORNEYS.
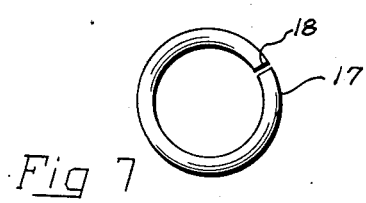
Fig 7

Patented Sept. 26, 1939

2,174,105

UNITED STATES PATENT OFFICE 2,174,105

RESILIENT COUPLING FOR TUBING

George W. Haury, Chicago, Ill., assignor to The Imperial Brass Manufacturing Company, Chicago, Ill.

Application October 6, 1936, Serial No. 104,256

4 Claims. (Cl. 285—90)

My invention relates to couplings for tubing and more particularly to a coupling for tubing which is subject to exceptional vibration during use.

The object of my invention is to provide a new and improved coupling for tubing which will firmly clamp the tubing in position and allow vibratory motion in the tubing without any permanent displacement or change in the original coupled position.

Another object is the provision of a new and improved coupling for tubing having two rigid parts and a deformable resilient part which is compressible between the rigid parts and squeezed against the tube to couple it resiliently in place.

Another object is the provision of a new and improved coupling for tubing having two rigid parts engaging to form a pocket therebetween and a resilient part compressible into the pocket and against the tubing to hold it in place.

Still another object is to provide a new and improved coupling for tubing composed of rigid parts having a passage through them for the tubing large enough for a clearance to remain between the walls of the passage and the tubing, a resilient sleeve being formed by clamping between the rigid parts and by said clamping squeezed into the clearance so as to both clamp the tube in the coupling and cushion the tube against shock.

A further object is the provision of a new and improved coupling for hard surfaced tubing composed of two rigid parts and a resilient sleeve member, squeezed between the rigid parts, the tubing being provided with a distortion in the surface to provide an added purchase for the resilient sleeve when squeezed against the tubing.

Further objects and advantages of my invention will become apparent as the description proceeds taken in connection with the accompanying drawing which forms a part of this specification.

Fig. 1 is a longitudinal section of the coupling in assembled relation.

Fig. 2 is a right end view.

Fig. 3 is a view of the nut and resilient sleeve on a tube.

Figs. 4 and 5 are views of the resilient sleeve.

Fig. 6 is a tube showing a modified form of the device.

Fig. 7 is the ring shown in Fig. 6.

While I have shown in the drawing and shall herein describe in detail the preferred embodiment of my invention together with a modification, it is to be understood that I do not thereby intend to limit the invention to the specific forms disclosed, but aim to cover all the modifications and alternative constructions falling within the spirit and scope of the appended claims.

In Fig. 1 a body member 1 is shown with a nut member or retaining means 2 attachable to the body member and a resilient sleeve 3 squeezed therebetween against a tube 4.

The body chosen for the sake of illustration is what is commonly termed a half union having a tapered pipe thread 5 and a hexagonal portion 6 to form a wrench hold. There is a passage 7 through the body member. At the right the body is extended in another threaded portion 8 which forms a wall around a space 9 adapted to receive the tube 4. It will be noted that there is a well defined clearance 10 between the inner wall of the threaded portion and the outer wall of the tube whose purpose will be later explained.

Engaged with the threaded portion 8 of the body 1 is a corresponding threaded portion 11 of the nut 2. Within the nut 2 at the left is an annular shoulder 12 adopted to surround the tube 4 leaving a substantial clearance 13. By means of the annular shoulder a pocket is formed between it and the right end of the threaded portion 8 of the body.

Clamping action is frictional and dependent on the resilient sleeve 3, shown in section in its normal shape in Fig. 3. The sleeve may be made of rubber, synthetic rubber or of any material which is capable of being distorted and pressed into different shapes without losing its resiliency and which has a reasonably high coefficient of friction. The sleeve has a central hole 15 of a size to permit the sleeve to slide snugly over the tube 4. To be effective the normal shape is not material but is here shown to be cylindrical and adapted to fit within the nut 2 and short enough to leave a few threads clear to start the nut on the body.

In the embodiment illustrated the tube 4 is a rigid metallic tube and has formed near the clamped end an annular recess 16 adjacent the sleeve by any means capable of either cutting the recess or bending it inward in the form shown.

When the coupling is assembled the resilient sleeve is positioned near the end of the tube as shown in Fig. 3 the nut 2 having been previously slid over the tube. Then the nut is forced down over the sleeve 3 and the tube 4 placed in the entrance of the space 9 of the body 1. The threads on the nut engage the threads on the body and the two parts are drawn together. The drawing operation squeezes the resilient sleeve and distorts it along the tube into the clearance 10 between the tube and the inside of the threaded portion 8 of the body and also into the clearance 13 between the tube and the shoulder of the nut. The pressure likewise compacts the sleeve into the pocket between the body and the nut and into the recess 16. The resilient sleeve is thereby pressed tightly against the tube and by its frictional and interlocking contact exerts an extremely strong hold on the tube resisting a force to separate the connection greater in most cases than the bursting pressure of the tube. By reason of its resilient consistency the sleeve simultaneously provides a cushion between the metallic parts of the body and the tube. Shocks of repeated and prolonged vibration are absorbed by the cushioning sleeve which shields the tubing from forces which would otherwise cause fatigue and the eventual breaking off of the tubing near the coupling.

A projection on the tube to engage the compacted sleeve is equal in effectiveness to a groove. To accomplish this the same type of groove is made near the end of the tube as previously described. After the nut has been slid on a ring 17 split at 18 is forced on the tube and snapped into the groove 16. The resilient sleeve is then put in place as illustrated in Fig. 3 and the joint made up as previously described.

Having thus described my invention what I claim and seek to secure by Letters Patent is:

1. In a connection for thin walled tubing a coupling element comprising a pair of coacting threaded parts each having a central bore, one of said parts being a male fitting exteriorly threaded and the other of said parts being a nut interiorly threaded to engage with the male fitting, a tube having an end extending through the nut and adapted to have its end only project into the male fitting, and having anchoring means thereon projecting beyond the surface of the tubing, and a compressible element on said tube adapted when the parts are threaded together to be compressed within the nut and brought into sealing contact with the tube at the area of its connection and distorted into engagement with said anchoring means whereby said tube is connected and retained in sealed contact with said coupling by means of said compressible element.

2. In a connection for thin walled tubing a coupling element comprising a pair of coacting threaded parts each having a central bore, one of said parts being a male fitting exteriorly threaded and the other of said parts being a nut interiorly threaded to engage with the male fitting, a tube having an end extending through the nut and adapted to have its end only project into the male fitting, and having annular anchoring means extending around the tube and beyond the surface thereof, and a compressible element on said tube adapted when the parts are threaded together to be compressed within the nut and brought into sealing contact with the tube at the area of its connection and distorted into engagement with said anchoring means whereby said tube is connected and retained in sealed contact with said coupling by means of said compressible element.

3. In a connection for thin walled tubing a coupling element comprising a pair of coacting threaded parts each having a central bore, one of said parts being a male fitting exteriorly threaded and the other of said parts being a nut interiorly threaded to engage with the male fitting, a tube having an end extending through the nut and adapted to have its end only project into the male fitting, and having a groove formed in the wall of the tubing, and an anchoring ring seated in said groove, a compressible element on said tube adapted to be compressed within the nut and brought into sealing contact with the tube at the area of its connection and distorted into engagement with said ring whereby said tube is connected and retained in sealed contact with said coupling by means of said compressible element.

4. In a connection for thin walled tubing, a coupling element comprising a pair of coacting threaded parts each having a central bore, a tube having an end extending through one of the parts, and adapted to have its end only project into the other part and having anchoring means thereon projecting beyond the surface of the tubing and a compressible element on said tube adapted when the parts are threaded together to be compressed between the parts and brought into sealing contact with the tube at the area of its connection and distorted into engagement with said anchoring means whereby said tube is connected and retained in sealed contact with said coupling by means of said compressible element.

GEORGE W. HAURY.